United States Patent

Beurrier

[15] 3,694,765

[45] Sept. 26, 1972

[54] SIGNAL COUPLING CIRCUIT

[72] Inventor: Henry Richard Beurrier, Old Chester Road, Far Hills, Chester Township, Morris County, N.J. 07931

[73] Assignee: Bell Telephone Laboratories Incorporated, Murray ill, N.J.

[22] Filed: Feb. 8, 1971

[21] Appl. No.: 113,213

[52] U.S. Cl. ..................................330/165, 330/124
[51] Int. Cl. ...............................................H03f 1/00
[58] Field of Search .........330/124 R, 165, 53, 11, 10

[56] References Cited

UNITED STATES PATENTS

| | | |
|---|---|---|
| 3,585,516 | 6/1971 | Ricaghi .............330/123 R X |
| 3,336,540 | 8/1967 | Kwartiroff et al..330/126 R X |

*Primary Examiner*—Nathan Kaufman
*Attorney*—R. J. Guenther and Arthur J. Torsiglieri

[57] ABSTRACT

This application describes a coupling circuit for coupling one or more signal sources to a common load without disturbing any of the coupled circuits. Each coupling circuit comprises a pair of amplifiers and a two-winding transformer. One amplifier, whose output impedance is much less than the load impedance, is connected to the transformer secondary winding. The other amplifier, whose output impedance is much larger than the load impedance, is connected to a center-tap on the transformer primary winding. The load and a matching impedance are connected to opposite ends of the primary winding. When more than one source is to be coupled to the load, the transformer primary windings are connected in series. A similar arrangement can be used at the input end of each amplifier. The suggested network can be used as the error injection network of a feed-forward amplifier.

9 Claims, 12 Drawing Figures

INVENTOR
H. R. BEURRIER
BY
Lyman Sherman
ATTORNEY

SIGNAL COUPLING CIRCUIT

This invention relates to electromagnetic signal coupling circuits.

BACKGROUND OF THE INVENTION

In U.S. Pat. 3,471,798, issued to H. Seidel, there is described a feed-forward amplifier wherein error components, introduced by the main signal amplifier, are identified and accumulated at a level and time sequence so that they can be injected into the main signal path in a manner to cancel the main signal error components. As explained therein, the error injection network which couples the error signal into the main signal wavepath must shield the error amplifier, which has a relatively small power handling capability, from the relatively large power output from the main amplifier. At the same time, the error injection network must permit the error signal to be injected into the main signal path without compromising the ability of the main amplifier to deliver its full output power to the load. These conflicting requirements were reasonably met by means of a transformer whose primary winding was coupled to the error amplifier, and whose secondary winding was placed in series with the main signal path. The transformer turns ratio was optimized to handle the maximum anticipated distortion.

The above-described arrangement has the disadvantage that there is coupling between the two signal paths. As such, some of the main amplifier output power is lost in the error circuit. In addition, some of the error correcting signal is coupled back towards the main signal amplifier. In the absence of an impedance match at the main amplifier output port, a portion of the error signal is reflected back towards the load, introducing spurious error components.

The general problem of coupling signals between different wavepaths, of which the above-described application is but one example, is encountered very often and, as such, is of considerable interest and importance.

It is, therefore, the broad object of the present invention to couple electromagnetic wave signals between wavepaths with minimum interaction among said wavepaths.

SUMMARY OF THE INVENTION

A signal coupling circuit, in accordance with the present invention, comprises: a pair of amplifiers having mutually inverse output impedances; and an output transformer.

The term "mutually inverse impedances" as used herein, means that relative to some reference impedance, the output impedance of one amplifier is much larger than the reference impedance, while the output impedance of the other amplifier is much less than the reference impedance. In the context of the present invention, the reference impedance is the load impedance. Specifically, the load is connected to one end of the output transformer primary winding. An equal matching impedance is connected to the other end of the primary winding. The higher output impedance amplifier is connected to a center tap on the primary winding. The lower output impedance amplifier is connected to the transformer secondary winding.

The signal source, coupled to the input ends of the amplifiers, causes each of said amplifiers to produce signal currents in each of the impedances connected to the transformer primary winding. The two currents in the load, being in phase, add constructively. The two currents in the matching impedance, on the other hand, are out of phase and add destructively. By adjusting the amplifier gains and/or the transformer turns ratio, the latter currents can be made to sum to zero, thus coupling all of the signal current to the useful load.

Where the amplifiers also have mutually inverse input impedance, a similar arrangement, using an input transformer, can be employed to couple into, as well as out of the amplifiers.

It is a feature of the invention that a plurality of signal sources can be coupled to a common load in the manner described, where all the output transformer primary windings, associated with the plurality of signal coupling circuits, are connected in series with each other and the load. Because of the very high output impedance of the amplifier connected to the center tap on each transformer primary winding, each of these amplifiers appears as an open circuit. Each of the other amplifiers, because of its very low output impedance, reflects a short circuit across the primary winding of its associated transformer. Thus, none of the signal sources senses any of the other signal sources. However, it should be noted that each amplifier in the sequence must be capable of handling the currents and voltages induced by all the other sources. As a result, each signal is, in effect, independently coupled to the load simultaneously with all the other signals.

It is a further feature of the invention that the load sees only the matching impedance connected to the other end of the output transformer primary windings. Hence, the load, in effect, sees a matched source notwithstanding the fact that the output impedances of the two amplifiers in each coupling circuit are, in reality, severely mismatched.

These and other objects and advantages, the nature of the present invention, and its various features will appear more fully upon consideration of the various illustrative embodiments now to be described in detail in connection with the accompanying drawings.

DETAILED DESCRIPTION

In the various embodiments now to be described, the same identification numerals are used in the several drawings to identify corresponding components.

Figure 1:
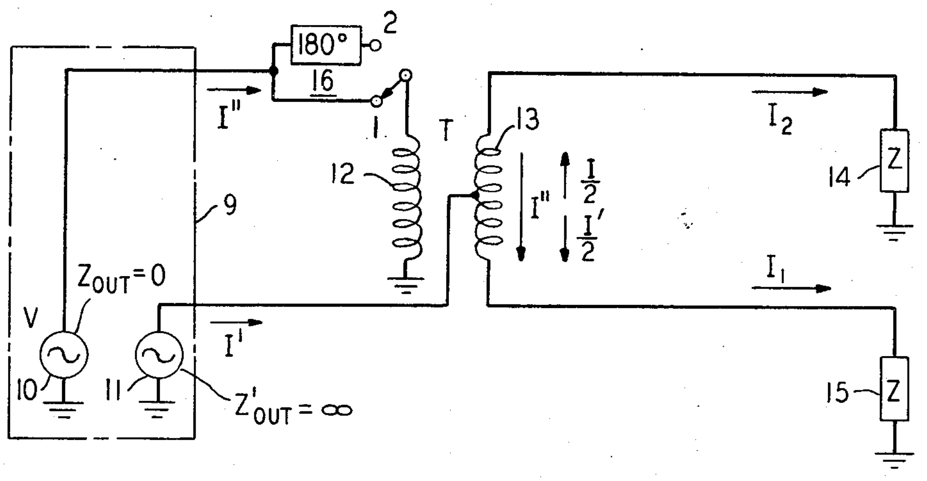
FIG. 1, included for purposes of explanation, shows, in block diagram, a simplified embodiment of the invention.

Referring now to the first drawing, FIG. 1, included for purposes of explanation, shows, in block diagram, a simplified embodiment of the invention, comprising: a signal source 9, whose output includes two coherent components $I'$ and $I''$; a two-winding transformer T, having a 1:1 turns ratio; and a pair of equal impedances 14 and 15. In particular, signal component $I'$ is derived from a constant current generator 11, which is connected to a center tap on the primary winding 13 of transformer T. The ends of the primary winding are connected, respectively, to impedances 14 and 15. The other signal component $I''$ is derived from a constant voltage generator 10, which is connected, through a two position switch 16, to one end of secondary winding 12. In position 1 shown, source 10 is connected directly to the transformer. In position 2, an additional 180° of relative phase shift is included for reasons which will be explained hereinbelow. The other end of winding 12 is grounded.

In operation, current component $I'$ from source 9 divides into two equal components $I'/2$ in winding 13, with one component flowing towards impedance 15 and the other component flowing towards impedance 14. Because they are equal and flow in opposite directions, there is no net magnetic coupling between windings 13 and 12. In addition, current component $I''$, flowing through winding 12, induces an equal current $I''$ in winding 13. With currents $I'$ and $I''$ in phase, the two like-directed current components $I''$ and $I'/2$ add constructively, producing a net current $$I_1=I''+I'/2 \qquad (1)$$

in impedance 15. The two oppositely-directed current components, on the other hand, add destructively, producing a net current $$I_2=I''-I'/2 \qquad (2)$$

in impedance 14.

In the preferred case where $$I''=I'/2, \qquad (3)$$

$$I_1=I'=2I'' \qquad (4)$$

and $$I_2=0. \qquad (5)$$

When switch 16 is in position 2, the direction of current component $I''$ in primary winding 13 is reversed. As a result, the currents add constructively in impedance 14 and destructively in impedance 15 such that $$I_1=0 \qquad (6)$$

and $$I_2=I'=2I''. \qquad (7)$$

Figures 2, 3:
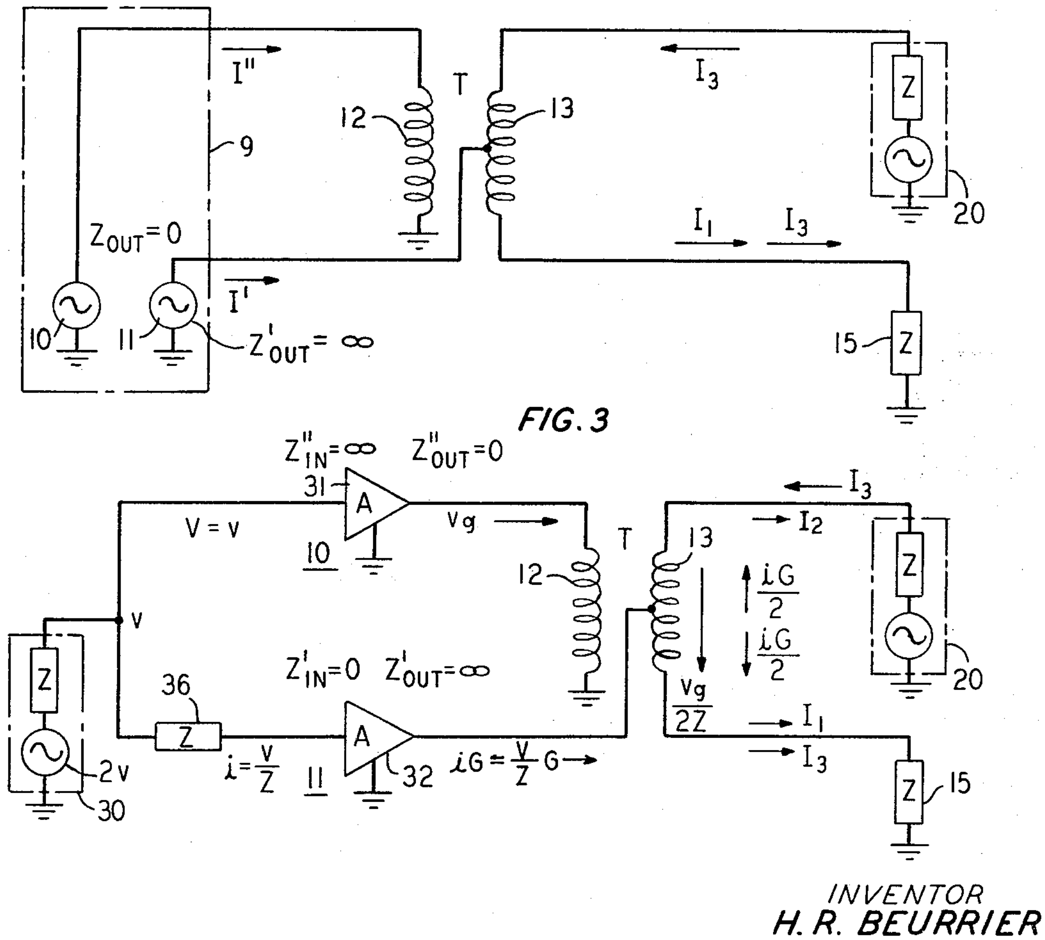
FIG. 2 shows the embodiment of FIG. 1, modified to include a second signal source.
FIG. 3 shows a first embodiment of the invention for independently coupling wave energy between two signal sources and a common load.

FIG. 2 is a modification of the embodiment of FIG. 1 wherein the switch 16 is omitted, so that current components $I'$ and $I''$ add in phase in impedance 15, and wherein impedance 14 is replaced by a second signal source 20 whose output impedance $Z$ is equal to load impedance 15.

In operation, current components $I'$ and $I''$ combine in primary winding 13, in the manner described above, to produce a current $I_1 = I'$ in load 15. In addition, source 20 produces an output current $I_3$, which is also coupled to load 15.

As indicated hereinabove, generator 10 was characterized as a "constant voltage" generator. Ideally, such a generator has zero output impedance (i.e., $Z''_{out}=0$). Conversely, generator 11 is a "constant current" generator which, ideally, has infinite output impedance (i.e., $Z'_{out} = \infty$). As a consequence, generator 11 appears as an open circuit connected to the center tap on winding 13 and, hence, none of the signal current $I_3$ is coupled to generator 11. Similarly, generator 10 appears as a short circuit across winding 12, reflecting a short circuit across winding 13. Thus, current $I_3$ is coupled directly to load 15 as if transformer T, and its associated signal generators 10 and 11, were not present. Accordingly, the circuit of FIG. 2 permits two signal sources 9 and 20 to couple separate signals to a common load 15 without either of the sources sensing the presence of the other.

A second feature of these circuits to be noted is that the load does not sense the presence of signal source 9 for the same reasons that source 20 does not sense the presence of source 9. Thus, load 15 only sees the matching impedance 14 in the embodiment of FIG. 1 or, in the embodiment of FIG. 2, the output impedance of source 20 which, it was indicated, is equal to the load impedance. Thus, in addition to completely isolating the two signal sources, a coupling circuit in accordance with the present invention, provides a match for the load in spite of the fact that the individual generators 10 and 11, comprising source 9, are badly mismatched with respect to the load.

In the illustrative embodiments of FIGS. 1 and 2, sources 10 and 11 are depicted as separate generators. However, it is apparent from the explanation given hereinabove, that they must be coherent generators whose outputs are related in a prescribed manner. In a first arrangement for energizing transformer T, now to be described in connection with FIG. 3, generators 10 and 11 comprise amplifiers 31 and 32 driven by a common signal source 30 in the manner described in my copending application Serial No. 113,200, filed Feb. 8, 1971, and assigned to applicant's assignee. As described therein, amplifiers 31 and 32, which can include one or more active elements, have mutually inverse input and output impedances, where the term "-mutually inverse input impedances," as used herein, means that relative to some reference impedance, the input impedance of one amplifier is much larger (preferably an order of magnitude or more greater) than the reference impedance, while the input impedance of the other amplifier is much smaller (preferably at least an order of magnitude less) than the chosen reference impedance. Similarly, the term "-mutually inverse output impedances" means that the output impedance of one of the amplifiers is much greater than some given reference impedance, while the output impedance of the other amplifier is much smaller than the given reference impedance. In the illustrative embodiment of FIG. 3, the amplifier input impedances are measured relative to the output impedance of source 30, while the amplifier output impedances are measured relative to the impedance of load 15. For purposes of explanation, source 30, source 20 and load 15 are assumed to have the same impedance $Z$. Thus, in the embodiment of FIG. 3, the input and output impedances of amplifier 31 and 32 are such that $$Z''_{in} > Z > Z'_{in} \quad (8)$$

and $$Z'_{out} > Z > Z''_{out}. \quad (9)$$

Alternatively, the same amplifier can have both the higher input as well as the higher output impedance, as will be illustrated in greater detail hereinbelow.

Source 30 is coupled directly to the higher input impedance amplifier 31, and is coupled to the lower input impedance amplifier 32 through a series impedance 36 equal to the source impedance $Z$. The amplifier outputs are connected in the manner described previously in connection with FIGS. 1 and 2. That is, amplifier 32, corresponding to constant current generator 11, is connected to the center tap on winding 13, and amplifier 31, corresponding to the constant voltage generator 10 is connected to one end of winding 12.

In operation, signal source 30 causes an Since signal to be applied to amplifiers 31 and 32. Since the input impedance of amplifier 31 is infinite, the signal source current is determined by the source impedance and series impedance 36. Assuming an open-circuit source voltage of $2V$, the current $i$ into amplifier 32 is $$i=2v/2Z=v/Z. \quad (10)$$

The signal voltage $V$ applied to amplifier 31 is $$V=iZ. \quad (11)$$

Substituting from equation (10) for $i$, we obtain $$V=v. \quad (12)$$

The outputs from amplifiers 31 and 32 are $vg$ and $iG$, respectively, where $g$ and $G$ are the amplifier gains. Current $iG$ divides equally in transformer winding 13, with one-half, $iG/2$, flowing into load 15 and the other half flowing towards source 20. Voltage $vg$, impressed across winding 12, induces an equal voltage across winding 13 causing a current $vg/2Z$ to flow towards load 15. The total currents $I_1$ into load 14, and $I_2$ into source 20 are then $$I_1=vb/2z+iG/2 \quad (13)$$

and $$I_2=vg/2Z-iG/2. \quad (14)$$

Substituting from equation (10), for $i$, we obtain $$I_1=(v/2Z)(g+G) \quad (15)$$

and $$I_2=(v/2Z)(g-G). \quad (16)$$

By making the amplifier gains equal (i.e., $g=G$), we obtain the preferred condition that signal current $$I_1=v/Zg=ig \quad (17)$$

is coupled to load 15, while none of the signal produced by source 30 reaches the second signal source 20. Simultaneously, all of the signal current $I_3$, from signal source 20, is likewise coupled to load 15, as explained hereinabove, with essentially none of signal current $I_3$ being dissipated in amplifiers 31 and 32.

Figure 4:
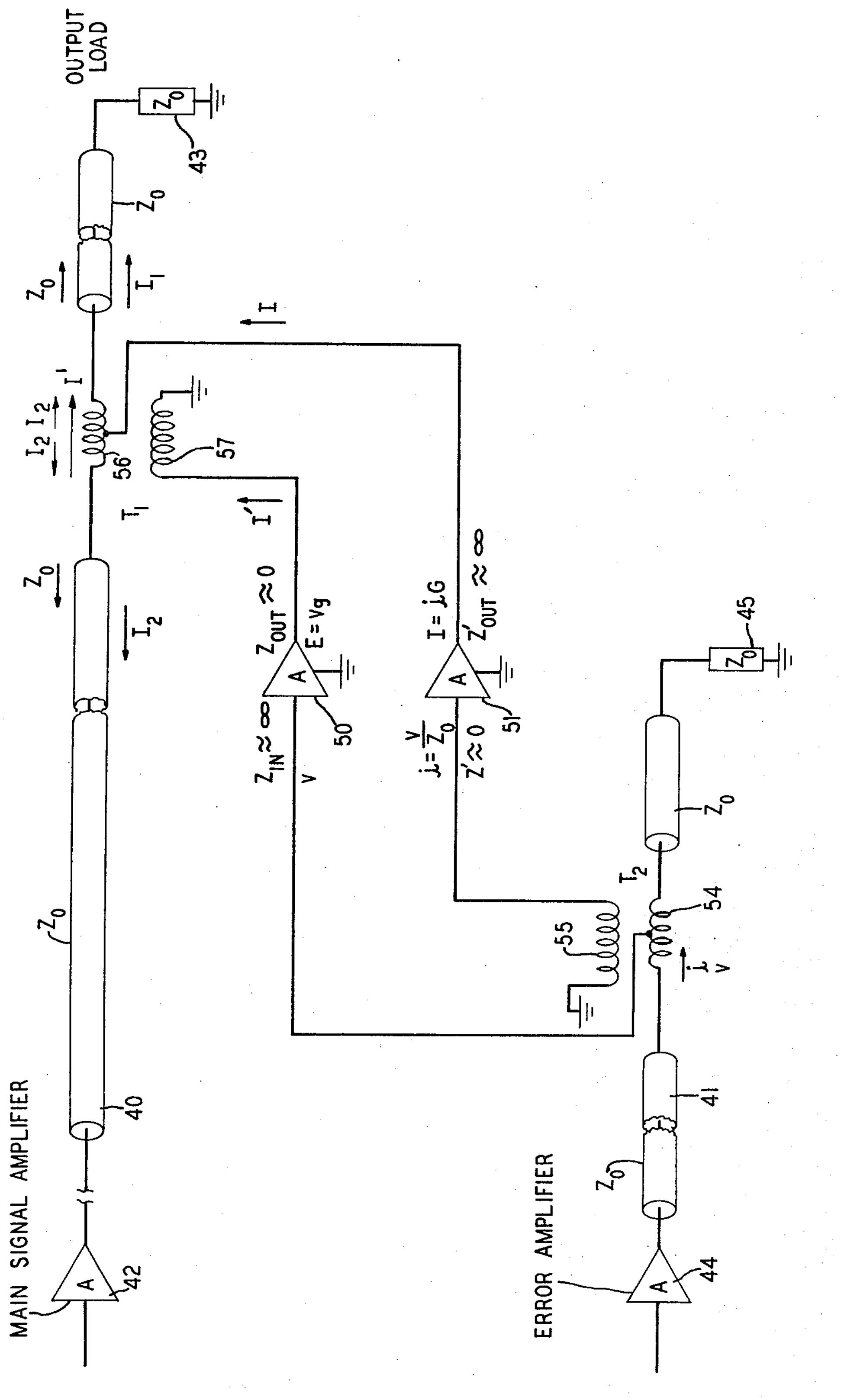
FIG. 4 shows a second embodiment of the present invention with particular reference to feed-forward amplifiers.

The present invention, which permits two signal sources to couple wave energy to a common load without interacting with each other, is of particular interest in connection with feed-forward amplifiers of the type described by H. Seidel in the above-cited U.S. Pat. No. 3,471,798. As indicated by Seidel, error correction in a feed-forward amplifier is realized by injecting an error correcting signal into the main signal wavepath. Preferably, this should be done without adversely interfering with the main signal, or subjecting the relatively small error amplifier to the relatively larger power output from the main amplifier. FIG. 4 illustrates an application of the present invention to the realization of these objectives. In this illustrative embodiment, the main signal path comprises a first transmission line 40 driven at one end by a main signal amplifier 42, and terminated at its other end by an output load 43. The error wavepath comprises a second transmission line 41, driven at one end by an error amplifier 44, and terminated at its other end by an impedance 45. For purposes of illustration, both transmission lines have the same characteristic impedance $Z_o$, and are match-terminated at both ends.

The error injection network, for coupling the error signal from transmission line 41 into output load 43, comprises: amplifiers 50 and 51, having mutually inverse input and output impedances; output transformer $T_1$; and input transformer $T_2$. While the input coupling arrangement illustrated in FIG. 3 could have been used, FIG. 4 illustrates an alternative input circuit which utilizes the principles of the present invention. More specifically, the primary winding 54 of input transformer $T_2$ is connected in series with transmission line 41. Similarly, the primary winding 56 of output transformer $T_1$ is connected in series with transmission line 40. The amplifiers are connected to the input and output transformers in a manner which depends on the magnitude of their respective input and output impedance. For purposes of illustration, amplifier 50, whose input impedance $Z_{in}$ is very larger ($\approx \infty$), is coupled to the center tap on primary winding 54. Amplifier 51, which has a very small input impedance $Z'_{in}$ ($\approx 0$), is connected to one end of secondary winding 55 of the input transformer. The other end of the secondary winding is grounded.

In a similar fashion, the amplifier having the higher output impedance which, in this embodiment, is amplifier 51 ($Z'_{out} \approx \infty$), is connected to the center tap on primary winding 56 of the output transformer $T_1$. Amplifier 51, having the lower output impedance ($Z_o \approx 0$), is connected to one end of the secondary winding 57 of transformer $T_1$. The other end of secondary winding 57 is grounded.

It will be recognized that transformers $T_1$ and $T_2$ can, in the most general case, have any arbitrary turns ratios. However, in the preferred embodiment of the invention, both transformers are tightly wound bifilar windings having 1:1 turns ratios. This arrangement is preferred so as to minimize leakage reactance. The core inductance of the transformers is designed to be large with respect to the impedance connected across their secondary windings. As will become apparent hereinbelow, the input impedance $Z'_{in}$ of amplifier 51 and the output impedance $Z_{out}$ of the amplifier 50 are both very small (i.e., ideally both are zero). Hence, transformers having very few turns and relatively small core impedances can be used.

As indicated hereinabove, it is the function of the error injection network to inject an error signal into the main signal wavepath. Thus, in operation, error amplifier 44 produces a signal in transmission line 41 which, at the input transformer $T_2$, has a voltage $v$ and current $i$. In addition, to current and voltage are related by characteristic impedance of the line such that $$i = v/Z_o. \quad (18)$$

The signal voltage $v$ is coupled directly to the input port of amplifier 50 which, because of its very high input impedance, draws no current. Current $i$, flowing through primary winding 54, induces an equal current $i$ in the secondary winding 55, which is coupled to the input port of amplifier 51. It will be noted that because of the very low input impedance of amplifier 51 (i.e., ideally $Z'_{in}$ is equal to zero), a correspondingly equal low impedance is reflected across the primary winding. Since, as indicated above, $Z'_{in}$ is very much less than $Z_o$, the primary winding is essentially short circuited by amplifier 51 such that the net effect of placing transformer $T_2$ in series with transmission line 41 is negligible.

The signals impressed across the input terminals of the amplifiers are amplified and appear as an output voltage $E = vg$ at the output of amplifier 50, and as an output current $I = iG$ at the output of amplifier 51.

The latter current is coupled to the center tap on primary winding 56 of output transformer $T_1$ wherein it divides into two equal components $I/2$. One component flows towards the output load 43, whereas the other component flows in the opposite direction, towards the main amplifier 42. Because the current components flow in opposite directions, they induce no net current in the secondary winding 57.

The signal E coupled to secondary winding 57 induces an equal voltage in the primary winding, causing a current $$I' = E/o\,2Z \quad (19)$$

to flow. This second current component, however, flows away from amplifier 42 and in the direction of the load 43. Hence, it adds constructively with the similarly-directed current component provided by amplifier 51, but adds destructively with the oppositely-directed current component. Designating the sum of the former two as $I_1$ and the sum of the latter two as $I_2$, we have $$I_1 = I' + I/2 \quad (20)$$

and $$I_2 = I' - I/2. \quad (21)$$

Expressing the currents in equations (20) and (21) in terms of the input current, $i$, we obtain $$I_1 = i/2\,(G+g) \quad (22)$$

and $$I_2 = i/2\,(G-g). \quad (23)$$

In the preferred embodiment, none of the injected current flows back towards the main amplifier. Therefore, in terms of equation (23), $$I_2 = 0, \quad (24)$$

in which case, $$G = g. \quad (25)$$

Thus, for the stated conditions, the gain of the amplifiers are equal, and the injected error signal $I_1$ is given by $$I_1 = iG. \quad (26)$$

As in the case of the input transformer, the impedance in series with the secondary winding 57 is the output impedance of amplifier 50 which, it was noted, is very small. Hence, the impedance reflected across primary winding 56 is equally small. Thus, the net effect produced upon the main signal by transformer $T_1$ is also negligible.

Thus, in summary, the signal coupling network of FIG. 4 directionally couples a signal from a first to a second circuit that is proportional to the current in the first circuit, and does so without disturbing either of the circuits in any significant manner.

FIGS. 5 through 11, now to be described, illustrate various amplifiers that can be employed to practice the invention. To simplify the drawings, the conventional direct current biasing circuits have been omitted.

Figure 5:
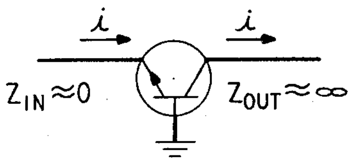
FIGS. 5 through 11 illustrate various amplifiers that can be used to practice the present invention.
Figure 6:
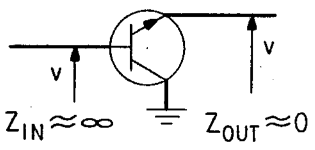

As is known, a transistor, connected in the common base configuration, as illustrated in FIG. 5, transforms a current $i$, with unity gain, from a low to a high impedance. To within a good approximation, the input impedance $Z_{in}$ of a common base transistor is zero, and its output impedance $Z_{out}$ is infinite. Conversely, a transistor connected in a common collector configuration, as illustrated in FIG. 6, transforms a voltage $v$, with unity gain, from a high impedance to a low impedance. Thus, to within an equally good approximation, the input impedance $Z_{in}$ of a common collector transistor is infinite, and its output impedance $Z_{out}$ is zero.

Figure 7:
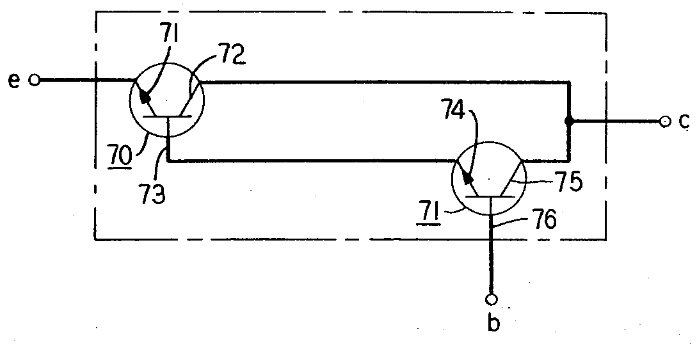

It will be recognized, however, that in a practical case the input and output impedances, if small, will be greater than zero and, if large, will be less than infinite. Nevertheless, relative to a specific source impedance $Z_o$ and a specific load impedance $Z'_o$, they can, for all practical purposes, be considered to be zero or infinite. If, however, a better approximation is required, a Darlington pair, as illustrated in FIG. 7, can be used. In this arrangement, the base 73 of a first transistor 70 is connected to the emitter 74 of a second transistor 71. The two collectors 72 and 75 are connected together to form the collector $c$ for the pair. The emitter 71 of transistor 70 is the pair emitter $e$, while the base 76 of transistor 71 is the pair base $b$.

The gain factor $\alpha$ for such a pair is given by $$\alpha = \alpha_1 + (1-\alpha_1)\,\alpha_2, \quad (27)$$

where $\alpha_1$ and $\alpha_2$ are the gain factors and transistors 70 and 71, respectively. If, for example, $\alpha_1$ and $\alpha_2$ are both equal to 0.95, the $\alpha$ for the Darlington pair is then equal to 0.9975. Correspondingly, the input and output impedances for a Darlington pair more nearly approach the ideal values.

It will be noted that there is an impedance transformation between input and output for each of the transistor configurations illustrated in FIGS. 5 and 6. However, as was noted hereinabove, the same amplifier can have both the lower input and output impedances, while the other amplifier has the higher input and output impedances. Active stages of these sorts are illustrated in FIGS. 8 and 9.

Figure 8:
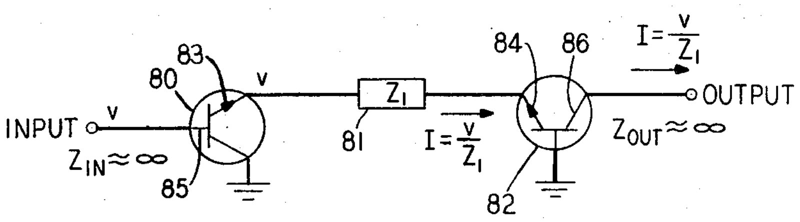

In the embodiment of FIG. 8, a first transistor 80, connected in the common collector configuration, is coupled to a second transistor 82, connected in the common base configuration, through a series impedance 81. In operation, a voltage $v$ applied to the base 85 of transistor 80 induces a voltage $v$ at the emitter 83 which is impressed across impedance 81. This, in turn, causes a current $v/Z_1$ to flow into the emitter 84 of transistor 82, producing an output current $I = v/Z_1$ in collector 86.

Figure 9:
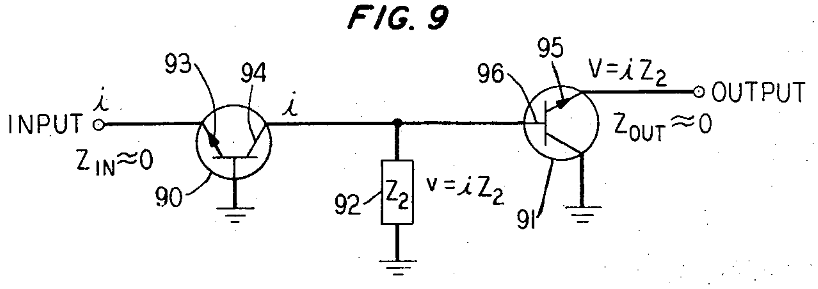
Figure 10:
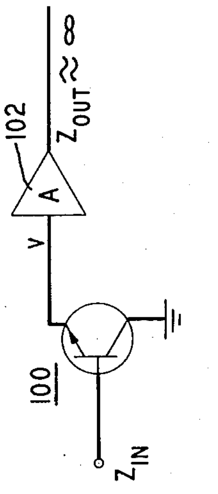

In the embodiment of FIG. 9, a first transistor 90, connected in the common base configuration, is coupled to a second transistor 91 by means of a shunt impedance 92. In operation, a current $i$ applied to the emitter 93 of transistor 90 causes a current $i$ in the collector 94. This current, flowing through impedance 92 produces a voltage $v = iZ_2$ at the base 96 of transistor 91. This, in turn, produces an equal output voltage $V = iZ_2$ at the emitter 95 of transistor 91.

It will be noted that in each of these circuits the input impedance $Z_{in}$ and the output impedance $Z_{out}$ are of the same order of magnitude. Ideally, the input and output impedance for the circuit shown in FIG. 8 are infinite, whereas in the embodiment shown in FIG. 9, these impedances are zero.

In the illustrative embodiments of FIGS. 3 and 4, the amplifiers were assumed to be of the type illustrated in FIGS. 5 and 6 in that the amplifier with the higher input impedance had the lower output impedance, and vice versa. If, however, amplifiers of the type illustrated in FIGS. 8 and 9 are used, the amplifier having the larger input impedance will also have the larger output impedance, and the amplifier with the lower input impedance will have the lower output impedance. This will necessitate a change in the manner in which the amplifiers are connected to the transformers. For example, the rule is that the higher impedance amplifier is connected to the primary center tap, and the lower impedance amplifier is connected to the secondary winding. Thus, in the embodiment of FIG. 4, amplifier 50, having the higher input impedance, is connected to the center tap on winding 54 of input transformer $T_2$, while amplifier 51, having the higher output impedance, is connected to the center tap on winding 56 of output transformer $T_1$. If, on the other hand, amplifier 50 also had the higher output impedance, it would be connected to the center tap on winding 56 and amplifier 51, with the lower output impedance, would be connected to secondary winding 57.

Figure 11:
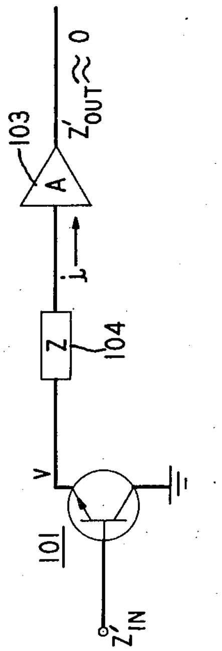

The amplifiers illustrated in FIGS. 5 and 6, and 8 and 9 are characterized by mutually inverse input and output impedances. By contrast, the amplifiers now to be described in connection with FIGS. 10 and 11 have mutually inverse output impedances, but the same input impedances. For example, in the embodiment of FIG. 10, a first transistor stage 100, connected in a common collector configuration, drives an amplifier 102 of the type illustrated in FIG. 8. In the embodiment of FIG. 11, an identical transistor stage 101 drives an amplifier 103, of the type illustrated in FIG. 9, through a series impedance 104. Thus, while the output impedances of these two amplifiers, $Z_{out}$ and $Z'_{out}$, are mutually inverse, their input impedances $Z_{in}$ and $Z'_{in}$ are equal. In this latter case, the two amplifiers can be separately energized from a common source directly, or by means of a transformer, as will be illustrated in FIG. 12 hereinbelow, or by any other conventional means.

Figure 12:
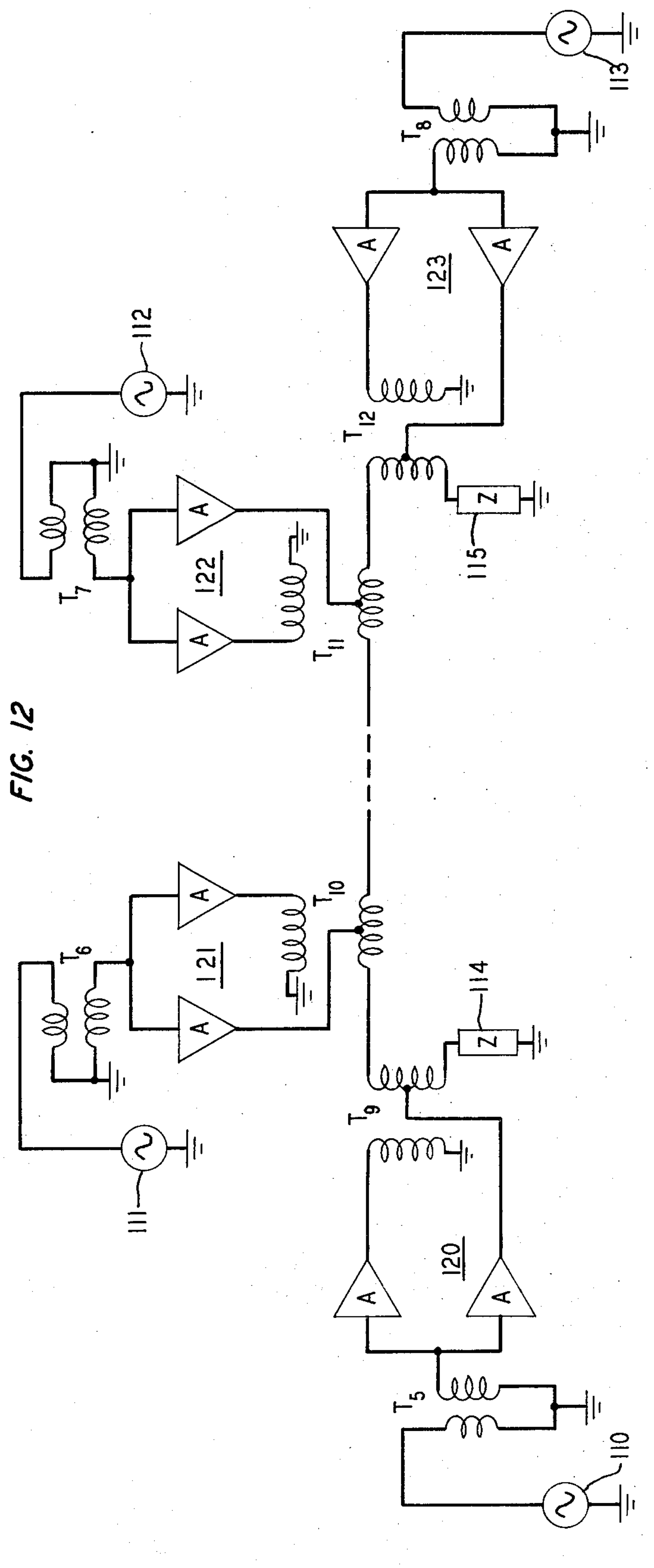
FIG. 12 shows a third embodiment of the invention for coupling more than two signal sources to a common load.

In the embodiments of FIGS. 2 and 3, signal source 20 was referred to as having an output impedance equal to the load impedance. However, as is well known, signal sources having arbitrarily prescribed output impedances are not readily available. It would be more convenient to terminate a line with a passive element, and couple each of the signal sources to the load by means of a coupling arrangement in accordance with the present invention. More generally, a plurality of two or more signal sources can be independently coupled to either one or both of two loads. Such an arrangement is illustrated in FIG. 12, wherein a plurality of different signal sources 110, 111, 112 and 113 are coupled to either of two loads 114 or 115. Using amplifiers of the type described in connection with FIGS. 10 and 11, the signal sources are connected to pairs of amplifiers 120, 121, 122 and 123 by means of input transformers $T_5$, $T_6$, $T_7$ and $T_8$, respectively, connected in the conventional manner. The amplifiers, in turn, are coupled to the load impedances by means of output transformers $T_9$, $T_{10}$, $T_{11}$ and $T_{12}$, connected in accordance with the present invention.

By adjusting the relative phases of the primary and secondary currents in transformers $T_9$, $T_{10}$, $T_{11}$ and $T_{12}$, the several input signals can be coupled independently to either or both load 114 and 115, or switched back and forth between the two.

It will be recognized that the various amplifiers described hereinabove are merely illustrative of the many possible specific embodiments which can represent applications of the principles of the present invention. So long as either the input and/or output impedances of the amplifiers are mutually inverse, the amplifiers can be coupled from a signal source and/or to a load in the manner described, Thus, numerous and varied other arrangements can readily be devised in accordance with these principles by those skilled in the art without departing from the spirit and scope of the invention.

We claim:

1. An electromagnetic wave circuit for coupling a signal source to a load comprising:
   - a pair of amplifiers, one of which has an output impedance that is larger than the impedance of said load, and the other of which has an output impedance that is smaller than the impedance of said load;
   - a two-winding output transformer;
   - means for coupling said signal source to the input ports of said amplifiers;
   - means for coupling the output port of the lower output impedance amplifier to one end of the secondary winding of said transformer;
   - means for grounding the other end of said secondary winding;
   - means for coupling the output port of the higher output impedance amplifier to a center tap on the primary winding of said transformer;
   - means for connecting said load to one end of said primary winding;
   - and a matching impedance connected to the other end of said primary winding.

2. The circuit according to claim 1 wherein the signal currents produced in said load by said amplifiers are equal and add in phase, whereas said signal currents add out of phase in said matching impedance.

3. The circuit according to claim 1 wherein said matching impedance is a second signal source having an output impedance equal to said load impedance.

4. The circuit according to claim 1 wherein said transformer has a 1:1 turns ratio.

5. The circuit according to claim 1 wherein one of said amplifiers has an input impedance that is larger than the impedance of said source, and the other of said amplifiers has an input impedance that is smaller than the impedance of said source.

6. The circuit according to claim 5 wherein said means for connecting said source to said amplifiers comprises:

an input transformer;

means for connecting the lower input impedance amplifier to one end of the secondary winding of said input transformer;

means for grounding the other end of said input transformer secondary winding;

means for connecting the higher input impedance amplifier to a center tap on the primary winding of said input transformer;

means for connecting said source to one end of said input transformer primary winding;

and a matching impedance connected to the other end of said input transformer primary winding.

7. The circuit according to claim 5 wherein the terminal impedances of said amplifiers differ from the source and load impedances by about one order of magnitude.

8. The circuit according to claim 1 wherein the output impedance of said one amplifier is at least an order of magnitude larger than said load impedance;

and wherein the output impedance of said other amplifier is at least an order of magnitude smaller than said load impedance.

9. In combination:

a plurality of signal sources;

a common output load;

and a plurality of coupling circuits for coupling said signal sources to said common load, wherein each of said coupling circuits comprises:

a pair of amplifiers, one of which has an output impedance that is at least an order of magnitude larger than the impedance of said load, and the other of which has an output impedance that is at least an order of magnitude smaller than the impedance of said load;

a two-winding output transformer having a primary winding and a secondary winding;

means for coupling the output port of the lower output impedance amplifier to one end of the secondary winding of said output transformer;

means for grounding the other end of said secondary winding;

means for coupling the output port of the higher output impedance amplifier to a center-tap on the primary winding of said output transformer;

means for connecting the primary windings in said plurality of coupling circuits in series;

said output load being connected between one end of said series-connected primary windings and ground;

a matching impedance connected between the other end of said series connected primary windings and ground;

and means for coupling a different one of said signal sources to the input ports of each pair of said amplifiers.

* * * * *